US007272533B2

(12) United States Patent
Schlösser

(10) Patent No.: US 7,272,533 B2
(45) Date of Patent: Sep. 18, 2007

(54) DIAGNOSTIC DEVICE FOR A FLUIDIC DEVICE AND A FLUIDIC DEVICE EQUIPPED THEREWITH

(75) Inventor: Ernest Schlösser, Driedorf-Heiligenborn (DE)

(73) Assignees: Festo AG & Co., Esslingen (DE); Beck IPC GmbH, Pohlheim-Garbenteich (DE)

( * ) Notice: Subject to any disclaimer, the term of this patent is extended or adjusted under 35 U.S.C. 154(b) by 630 days.

(21) Appl. No.: 10/325,080

(22) Filed: Dec. 20, 2002

(65) Prior Publication Data

US 2003/0125841 A1 Jul. 3, 2003

(30) Foreign Application Priority Data

Dec. 20, 2001 (DE) .......................... 201 20 609 U

(51) Int. Cl.
*G06F 11/30* (2006.01)
*G21C 17/00* (2006.01)

(52) U.S. Cl. ...................................................... 702/184

(58) Field of Classification Search ............ 702/33-35, 702/50-55, 56, 81, 84, 182-184
See application file for complete search history.

(56) References Cited

U.S. PATENT DOCUMENTS 6,016,204 A * 1/2000 Budnik et al. ............ 358/1.14
6,213,739 B1 * 4/2001 Phallen et al. ............. 417/478
6,666,093 B2 * 12/2003 Morganti ..................... 73/587
6,823,270 B1 * 11/2004 Roys ........................... 702/45

FOREIGN PATENT DOCUMENTS

| | | | |
|---|---|---|---|
| DE | 292 052 A5 | | 10/1983 |
| DE | 297 20 281 U1 | | 4/1998 |
| EP | 315 391 | * | 5/1989 |
| EP | 2005/111433 | * | 11/2005 |

* cited by examiner

*Primary Examiner*—Michael Nghiem
(74) *Attorney, Agent, or Firm*—Hoffmann & Baron, LLP

(57) ABSTRACT

The invention pertains to a diagnostic device for a fluidic device (11, 12, 23), in particular for a valve array and or a maintenance unit. Furthermore, the invention pertains to a fluidic device (11, 12, 23) equipped with said diagnostic device. The diagnostic device preferably can be locally attached to the fluidic device (11, 12, 23). It features a diagnostic module (34) to determine at least one wear parameter (38*b*-40*b*,44) causing wear on the fluidic device (11,12,23) and for reporting of at least one wear status ascertained on the basis of the at least one wear parameter (38*b*-40*b*,44).

10 Claims, 2 Drawing Sheets

DIAGNOSTIC DEVICE FOR A FLUIDIC DEVICE AND A FLUIDIC DEVICE EQUIPPED THEREWITH

The application claims priority from Application No. DE 201 20 609.9, filed on Dec. 20, 2001.

FIELD OF INVENTION

The invention pertains to a diagnostic device for a fluidic device, in particular for a valve array, a fluidic actuator or a maintenance unit. Furthermore, the invention pertains to a fluidic device equipped with said diagnostic device.

BACKGROUND OF THE INVENTION

A fluidic device, for example, a pneumatic valve array, is subject to wear during use, which will adversely impact its operational dependability to an increasing extent over time, and ultimately lead to malfunction or even to complete failure of the fluidic device. If a malfunction or failure has occurred, the fluidic device will then have to be repaired or replaced by an intact fluidic device. However, it is often better from a cost point of view to prevent the malfunction or complete failure by providing advance maintenance of the fluidic device in a timely manner.

However, it is difficult to ascertain an optimum maintenance timepoint, since this moment in time can depend on many factors, in particular on the particular strain on the fluidic device caused by its operation.

It is therefore the purpose of the present invention to design a diagnostic device for a fluidic device and also a fluidic device itself which will signal the necessary maintenance in a timely manner before occurrence of a malfunction or a total failure of the fluidic device.

This problem is solved by a diagnostic device for a fluidic device, in particular for a valve array, a fluidic actuator or a maintenance unit, which features a diagnostic means to ascertain at least one wear parameter causing wear on the fluidic device, and to report at least one wear status determined on the basis of the at least one wear parameter.

The problem is furthermore solved by a fluidic device equipped with this kind of diagnostic device.

The diagnostic device constantly determines the current wear status of the fluidic device, e.g., of a maintenance unit or a pneumatic or hydraulic valve array, based on the wear parameter. In this regard, the number of piston strokes of a valve can be determined, for example, and after a limit value is reached, the wear status may be signaled so that a valve head, gaskets on the valve, or similar items can be examined and replaced as needed. The diagnostic device monitors the functional integrity of the fluidic device and reports the wear status preferably in a preventive manner, i.e., before there is a malfunction or even total failure of the fluidic device.

Additional advantages of the invention are indicated from the dependent claims and from the description.

As has already been indicated above, the diagnostic features report the wear status, preferably in a preventive manner. The fluidic device is then at least partly operational and/or has limited operating capability, so that at least a kind of emergency operation will still be possible. However, it is preferable that the fluidic device still be fully operational even after the occurrence of the worn state.

Preferably, the fluidic device can still continue to be operated for a predefined time before the maintenance necessary to alleviate the wear status has to be performed.

It is preferably to locate the [diagnostic device] at or on the fluidic device.

For the wear parameters, according to this invention various quantities can be evaluated by the diagnostic device, of which only a few will be mentioned as examples. Preferably the diagnostic device will evaluate at least one load state of the fluidic device as a wear parameter. For example, it can count the working cycles of the fluidic device, determine the particular fluid consumption of the fluidic device, and/or it can evaluate the particular speed of motion of an actuator element, for example, a piston, of the fluidic device. It is also obvious that any particular combinations of wear parameters can be used, whereby the particular wear parameters can be differently weighted by the diagnostic device.

It is preferable that the diagnostic device be equipped to control and/or monitor the fluidic device. Also, the converse is possible, that the diagnostic device be a constituent of a control unit provided to control and/or monitor the fluidic device, in particular one that can be locally attached to or located at the fluidic device. In any case, in both the aforementioned configurations, the control, monitoring and diagnosis should be combined into a single unit.

Preferably the diagnostic features are designed to ascertain and/or report at least one interference parameter that signals a fault in the fluidic device. The diagnostic device then reports a fault in the fluidic device, for example, when its actuator element is no longer capable of movement and/or when overheating has occurred.

Preferably the diagnostic device contains output features for optical and/or acoustical output of the at least one wear status. The output features can also be located at a distance from the diagnostic device, but still be associated with it. The diagnostic device communicates with the output features by means of a line connection, for example, or by wireless means, e.g., by radio.

Preferably the diagnostic features are designed to indicate a need for at least one replacement part suitable for maintaining the functional integrity of the fluidic device. The diagnostic device then orders, more or less, the required spare part. For example, the diagnostic device can indicate in the message pertaining to the wear status, the spare parts' numbers of one or more required replacement parts which are needed to correct the wear status. A message of this kind is sent by the diagnostic device, preferably to a spare parts procurement apparatus, for example, a spare parts depot or such.

The message regarding the wear status of the fluidic device can be sent by the diagnostic device to various locations. Preferably it sends the message to a display unit located away from the fluidic device, for example, to an alerting device for maintenance personnel. The display device can be, for example, a pager, a mobile telephone or similar device. But the diagnostic device can also send the message to a higher-order control unit for control of the fluidic device, for example, to a central computer or similar unit, and/or to a neighboring fluidic device cooperating with the fluidic device being monitored by it. It is also similarly for a fault message which the diagnostic device can send to one of the aforementioned destinations.

Preferably the diagnostic device is equipped to execute an emergency program so that additional wear during continued operation of the fluidic device can be kept to a minimum or avoided entirely. For example, the operating speed of a pneumatic working cylinder can be reduced by means of the diagnostic device.

Of course, with regard to the diagnostic device, in principle the particular values for the at least one wear status and/or the at least one wear parameter can be predetermined as defaults, for example, as permanently programmed values. However, it is preferable that these values be parameterized, i.e., that they be variable for example by a user input and/or by an instruction transmitted by a higher-order controller.

Preferably the diagnostic device forms a constituent of the fluidic device. It can be permanently connected to the fluidic device, that is, it can be integrated into its housing or preferably also it can be designed as a replaceable module, for instance, as a circuitboard module that plugs into the fluidic device. Preferably the diagnostic device is designed as an integrated monochip microprocessor array whose component constituents form a single electronic assembly.

Preferably the diagnostic device contains program code that can be executed by a processor unit. Of course, it is self-evident that the diagnostic device can be designed entirely as a hardware component or entirely as a software component, or can have both hardware and software constituents.

A software diagnostic device according to this invention can be stored preferably on a storage medium, for example, on a diskette, a hard disk drive, a compact disc or similar device.

One design example of the invention will be explained in greater detail below.

We have:

DETAILED DESCRIPTION OF THE PREFERRED EMBODIMENTS

Figure 1:
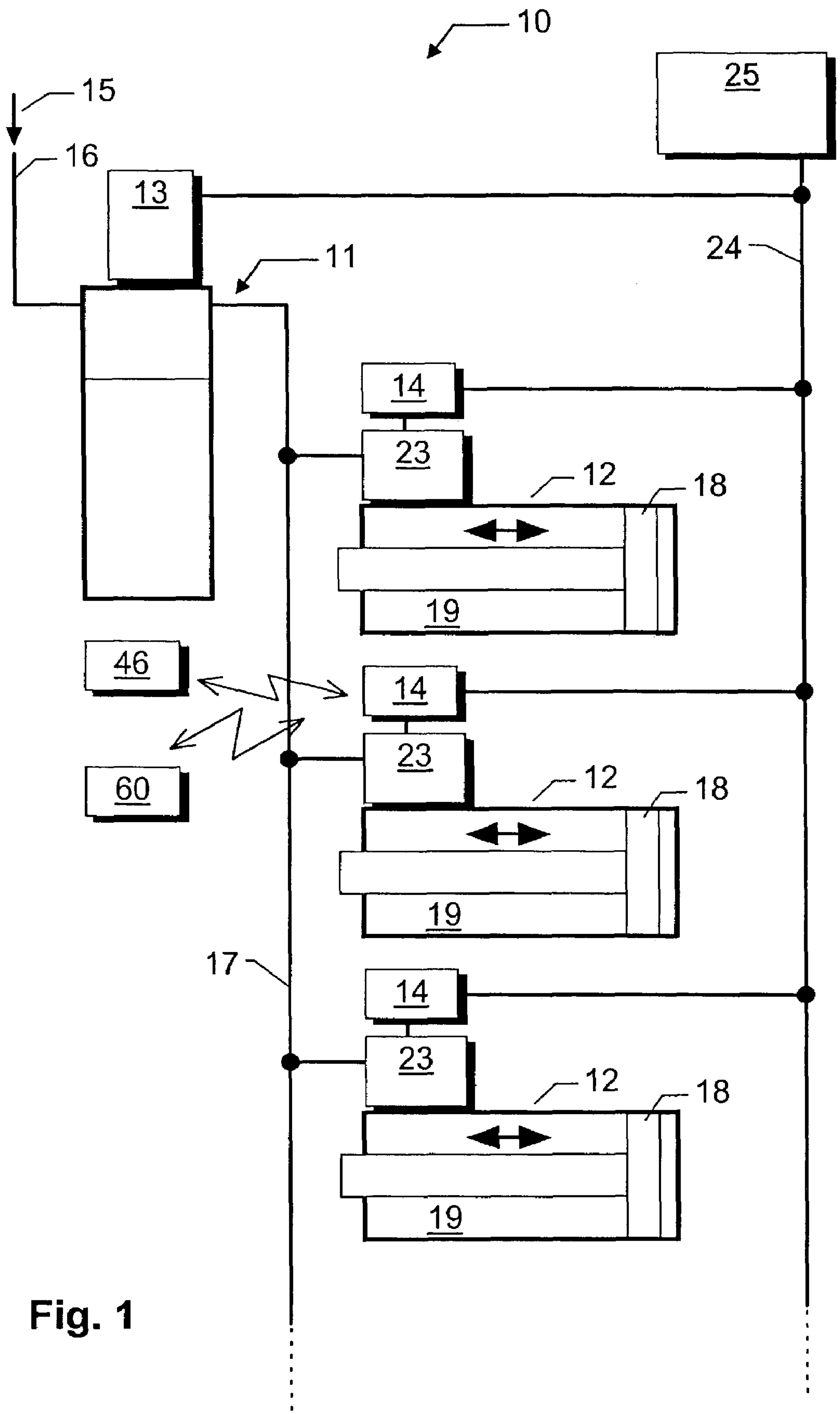
FIG. 1, a schematic view of a fluidic device 10 with a maintenance unit 11 and also working cylinders 12 which are equipped with diagnostic devices 13 or 14 according to this invention, and FIG. 2, a detailed view of FIG. 1, in which one of the working cylinders 12 and the diagnostic device 14 monitoring this cylinder are shown.

In the present case the fluidic device 10 pertains to a pneumatic device with several fluidic actuators upstream of the working cylinders 12. The device 10 is used, for instance, to drive a handling machine or similar unit. The device 10 is supplied with a compressed medium 15, in this case, compressed air, by a compressed air supply device (not illustrated). The compressed medium 15 is injected through a supply line 16 into the maintenance unit 11 which processes the compressed medium, e.g., by cleaning it and/or oiling it. The filters or additives, e.g., oil or such, needed for this are not shown in the illustration for the sake of simplification. In any case, the maintenance unit 11 supplies the working cylinder 12 with the treated compressed medium—in the present case, cleaned and oiled compressed air—15 through a supply line 17.

A piston 18 forming the actuator element is seated in a piston chamber 19 and moves back and forth in the working cylinder 12 which each forms a fluidic device. The piston chamber 19 is located inside a housing 20. The piston chamber 19 can be supplied with compressed air and vented through lines 21, 22, and the piston 18 will move back and forth during these processes; the compressed air comes from a valve array 23 which contains pneumatic control valves actuated by an electromagnet, for instance.

In the present device 10 one diagnostic device 14 is associated with each working cylinder 12; in the design example, this device also performs the function of a local controller. However, it would also be possible to associate with each working cylinder 12 a control unit separate from the diagnostic device 14 for local control, and this separate control unit could be an integral constituent of the valve array 23.

The diagnostic device 13, which in the present case serves to monitor and to diagnose the maintenance unit 11, is associated with the maintenance unit 11. The diagnostic devices 13, 14 are connected along a bus 24 to a central control computer 25. The control computer 25 controls and monitors the functions of the maintenance unit 11 and of the working cylinder 12.

Figure 2:
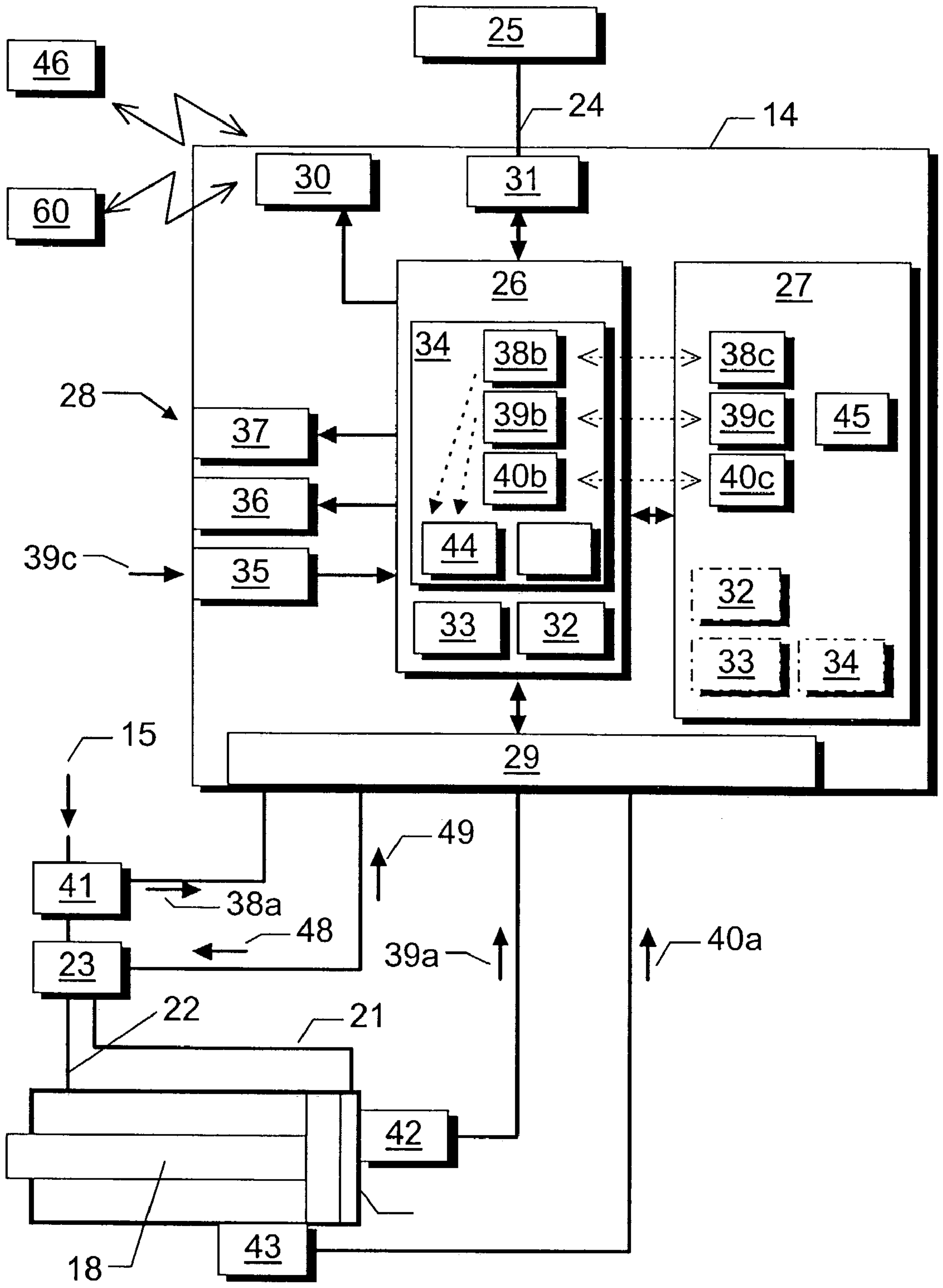

The diagnostic devices 13, 14 each ascertain at least one wear parameter which causes wear on the fluidic device 10. As soon as a wear status of the particular device 10 is determined on the basis of the wear parameter, this status will be reported by the particular diagnostic device 13, 14. The mode of operation of the diagnostic devices 13, 14 will be explained in greater detail below based on the diagnostic device 14 illustrated in FIG. 2.

The diagnostic device 14 in the present case is designed as a module, for example, as a monochip microprocessor array, which is locally associated with the working cylinder 12 or with the valve array 23. However, in principle it would also be possible to locate the diagnostic device 14 at a distance from the working cylinder 12 or from the valve array 23.

The diagnostic device 14 contains a microprocessor 26, memory features 27, for example, RAM and/or ROM modules (RAM=random access memory, ROM=read only memory), input and output devices 28 as well as interface devices 29 to 31. The microprocessor 26 executes program code from an operating system 32, a control module 33 and a diagnostic module 34 for control and monitoring, or for the diagnosis of the valve array 23 and of the working cylinder 12. At system start of the diagnostic device 14, the modules 32 to 34 are loaded from the memory 27 into the microprocessor 26 and then the coded instructions are executed by it. The input/output devices 28 are composed in the present case of a keyboard and/or a mouse 35, optical output device 36, e.g., a monitor, a liquid crystal display and/or a light-emitting diode device, and acoustical output device 37, e.g., a loudspeaker. The components of the diagnostic device 14, for example, the microprocessor 26, the memory devices 27 and the input and output devices 28 are connected to each other along appropriate connections (not illustrated).

A flow sensor 41 ascertains the quantity of compressed medium 15 that flows into the valve array 23 and thus into the working cylinder 12. The sensor 41 sends a measured value 38*a* representative for the particular rate of flow to the diagnostic module 34 along the interface device 29. The sensor 41 is connected in front of the valve array 23.

A position sensor 42 determines the particular position of the piston 18 and depending on this position, it sends associated measured position values 39*a* along the interfaces of the device 29 to the diagnostic module 34.

In addition to the position sensor 42, a temperature sensor 43 is also associated with the working cylinder 12. The sensor 43 determines its temperature and sends associated measured temperature values 40*a* along the interface device 29 to the diagnostic module 34.

The diagnostic module 34 takes the measured values 38*a*, 39*a*, 40*a* and forms the wear parameters 38*b*, 39*b* and 40*b*, respectively. Based on the wear parameters 38*b* to 40*b*, the diagnostic module 34 determines at least one wear status of the valve array 23 and/or of the working cylinder 12. A wear status is defined, for instance, by a limit value 38*c*, which is assigned to the wear parameter 38*b*. Additional wear states are defined, e.g., by limit values 39*c* and 40*c*, which are associated with the wear parameters 39*b* and 40*b*.

For example, the diagnostic module 34 adds the measured values for fluid flow 38*a* to the wear parameter 38*b* until the limit value 38*c* is reached. Wear on the valve array 23 or on the working cylinder 12 is caused by the compressed medium 15 which is needed to operate the working cylinder 12. Once an upper limit defined by the limit value 38*c* is reached, specified wear on the valve array 23 and/or on the working cylinder 12 has been reached. The diagnostic module 34 signals this wear status, for example, by means of the output devices 36, 37, by the output of a corresponding optical or acoustical message. For example, a warning tone may be output. Furthermore, a clear text spare parts number or other spare parts description can appear on the output device 37 to indicate the replacement part needed to correct the wear state ascertained based on the flow-through wear parameter 38*b*. For instance, the order number of gaskets or similar items to be replaced may be displayed.

Also, the combined position value 39*b* forms a wear parameter in the sense of this invention. For example, the diagnostic module 34 counts the working cycles of the working cylinder 12, that is, each back and forth stroke of the piston 18 in the combined [position] value 39*b*. After a predetermined number of working cycles as defined by the limit value 39*c*, a default wear state is reached which the diagnostic module 34 sends out to the output devices 36, 37. In this instance, a message such as "20,000 working cycles completed. Check the cylinder!" will be output as text or as a voice message.

Based on the measured position values 39*b* and to form the wear parameter 39*b*, the diagnostic module 34 can determine the particular speed of movement of the piston 18, its movement behavior or other wear parameters causing wear as derived from the measured position values 39*a*. For example, the movement behavior of the piston 18 has an effect on the wear of the working cylinder 12. When the piston 18 is moving at a high velocity and/or if it impacts against the particular end stop at a relatively high speed, then this will cause greater wear than if the piston is moving rather slowly and/or if it gently is moved up to the particular end stop. In any case, the diagnostic module 34 can evaluate the measured position value 39*b* in numerous ways in order to determine one or more wear states of the working cylinder 12.

To form the combined value 40*b*, which likewise represents a wear parameter, the diagnostic module 34 evaluates the measured temperature value 40*a*. Here, too, the diagnostic module 34 can monitor and/or integrate the measured temperature value 40*a* for a specified period of time. Furthermore, it is also possible for the diagnostic module 34 to use the measured temperature value 40*a* only to form the wear parameter 40*b* when a specified limit temperature value is exceeded. The diagnostic module 34 determines the wear state when the wear parameter 40*b* exceeds the limit value 40*c*. The diagnostic module 34, for example, reports this wear status to the central control computer 25 by means of the interface device 31.

In the described examples, the diagnostic module 34 determines the wear status based on a single measured value. But it is also possible for several different measured values to be taken into consideration by the diagnostic module 34 in the determination of a wear state. For example, the diagnostic module 34 takes the wear parameters 38*b* and 39*b* to form a combined wear parameter 44 in which the parameters 38*b*, 39*b* are included at a different weighting. For instance, the parameter 38*b* is weighted only half as much as the parameter 39*b*. If the combined wear parameter 44 exceeds a default limit value 45 stored in the memory 27, then the diagnostic module 34 will recognize a wear state which it will then output to the output devices 36, 37 and/or along the interface device 31 to the control computer 25 and/or along the interface device 30 to an alerting device 46.

For example, in the determination of a leak in the valve array 23 and/or of the working cylinder 12 which represents a wear state, several different types of measured values can be taken into account by the diagnostic module 34. In the case of a stopped or barely moving piston 18, for example, no compressed medium 15 or almost no compressed medium 15 can flow into the valve array 23. If this is nevertheless the case, then a leak has occurred in the valve array 23 and/or in the working cylinder 12, which may be caused, for instance, by the wear on a gasket, by a porous hose or such. The diagnostic module 34 recognizes this kind of wear state by the fact that the measured position value 39*a* changes little or not at all, but the measured flow value 38*a* exceeds a default value.

A message with information on the spare part needed to correct the wear state can be sent by the diagnostic module 14, for example, to a spare parts procurement device 60, e.g., a spare parts depot, or to another logistics system. In this case the diagnostic module 14 will send an SMS message, for example. The procurement device 60 will make the needed spare part available for the fluidic device 10 by having the particular spare part shipped by post (for example) to the site of the device 10.

The alerting device 46 pertains to a mobile radio telephone or to a pager, for example. The diagnostic device 16 will send an SMS message (SMS=short message service), for example, to the alerting device 46, in which the particular wear state and/or the spare part needed to correct the wear state is indicated. The interface device 31 forms a radio interface.

But it would also be possible for the alerting device 46 and/or the spare parts procurement system 60 to be connected by a wire, for example, by a bus connection, to the diagnostic module 14.

With regard to the diagnostic module 14 the limit values 38*c* to 40*c*, 45 can be parameterized. To do this, for example, corresponding values can be input by the keyboard 35. But it would also be possible that the diagnostic module 14 could be parameterized at a distance, for example, via the Internet, and the diagnostic module 14 would then be made available for parametering of the interfaces 38*a*-40*a*, 45 by a user interface operated along an internet browser. Furthermore, it is possible that even more values can be parameterized by the diagnostic module 14. For instance, the weighting factors that are used for weighting of the parameters 38*b* 39*b* in the formation of the parameter 44, could be themselves parameterized. Furthermore, the parameter 39*b* could be parameterized, for example, by specifying whether the number of working cycles of the working cylinder 12 and/or its motion behavior are to be taken into account in the determination of the particular wear state.

The diagnostic module 34 determines a fault in the working cylinder 12 and/or in the valve array 23 based on a fault parameter 47. For example, the fault parameter 47 may pertain to an overheating of the working cylinder 12 that the diagnostic module 34 determines based on the measured temperature value 40*a*. Also, the diagnostic module 34 can evaluate the measured values 38*a*, 39*a* in the determination of the fault parameter 47. For example, an unbraked impact of the piston 18 against an end stop can be determined with the aid of measured value 39*a*. Furthermore, a fault may also consist in that the working cylinder 12 and/or the valve array 23 has a leak. This can be determined by the diagnostic module 34 since the measured value 39*b* will not change, i.e., the piston 18 moves to a defined position, but the measured value 38*a* exceeds a default limit value, i.e., compressed medium 15 is flowing into the valve array 23, but the piston 18 is not then caused to move. In any case, the diagnostic module 34 detects a fault by reporting it, for example, to the alerting device 46 and/or to the control computer 25 and/or to a neighboring fluidic device, for instance, to the maintenance unit 11 or to a neighboring working cylinder 12.

If one or more of the above-mentioned wear states occurs and/or one of the fault states occurs, then the diagnostic module 34 can execute an emergency program. For example, the diagnostic module 34 will send a corresponding instruction to the control module 33. The control module 33 will then reduce the working speed and/or the working cycle of the piston 18, which will result in a reduced wear on the working cylinder 12. If a fault occurs, it is also possible that the control module 33 will shut down the working cylinder 12 and/or the valve array 23.

In the diagnostic unit 14, the diagnostic module 34 and the control module 33 are designed as separate units. A combined control and diagnostic module that performs the functions of both modules 33, 34 would also be possible.

The control module 33 sends switching commands 48 to the valve array 23 and receives from it the associated acknowledgment messages 49 when a switching command 48 has been executed. It is obvious that the control module 33 can send a message regarding its execution of a switching command to the diagnostic module 34, so that the diagnostic module 34 can determine one or more wear states of the valve array 23 and/or of the working cylinder 12 on the basis of such messages.

The diagnostic device 13 of the maintenance unit 11 can evaluate different wear parameters in order to determine the wear status. For instance, it can determine a quantity of additive that is injected into the compressed medium 15, and then if a default quantity has been reached, it will report the wear status, for example, to the control computer 25 and/or to the alerting device 46. Furthermore, as a wear parameter, the diagnostic device 13 can ascertain a temperature that causes elevated wear. In addition, for example, as a wear parameter it can also evaluate the quantity of the compressed medium 15 flowing through the maintenance unit 11, a pressure loading or such to determine the wear status. Combinations of the aforementioned parameters, and other wear parameters as well, would be possible for a determination of the wear status of the maintenance unit 11.

What is claimed is:

1. A diagnostic device for a fluidic device operable by a compressed fluidic medium, the diagnostic device comprising:

a diagnostic module to determine at least one wear parameter causing wear on the fluidic device, said diagnostic module including at least one of a flow sensor for monitoring a quantity of said compressed fluidic medium flowing into the fluidic device, a position sensor for determining a position of a movable actuator element of the fluidic device or a temperature sensor for measuring a temperature of the fluidic device; and an output module in communication with said diagnostic module for reporting of at least one wear status ascertained on the basis of the at least one wear parameter, wherein the at least one wear parameter pertains to the ascertainment of at least one load condition of the fluidic device, said load condition being based on a counting of working cycles of the fluidic device and/or to a specific fluid consumption of the fluidic device and/or to a speed of motion of the actuator element of the fluidic device, determined by one or more of said sensors, and wherein said output mudule is configured to indicate which part requires replacement for maintenance of the fluidic device.

2. A diagnostic device according to claim 1, wherein the values defining the at least one wear status and/or the at least one wear parameter are parameterized by the diagnostic device.

3. A diagnostic device according to claim 1, wherein the diagnostic device contains program code embedded in a computer-readable medium which can be executed by a processor unit to control and/or monitor the fluidic device.

4. A diagnostic device according to claim 1, wherein the diagnostic device is designed as an integrated monochip microprocessor device whose components form constituents of a single electronic element, the single electronic element being locally associated with the fluidic device.

5. A diagnostic device according to claim 1, wherein the output module for reporting of the at least one wear status is configured as a preventive message in which the fluidic device is partly operational and/or has limited operability.

6. A diagnostic device for a fluidic device operable by a compressed fluidic medium, the diagnostic device comprising:

a diagnostic module to determine at least one wear parameter causing wear on the fluidic device, said diagnostic module including at least one of a flow sensor for monitoring a quantity of said compressed fluidic medium flowing into the fluidic device, a position sensor for determining a position of a movable actuator element of the fluidic device or a temperature sensor for measuring a temperature of the fluidic device; and an output module in communication with said diagnostic module for reporting of at least one wear status ascertained on the basis of the at least one wear parameter, wherein the output module is configured to indicate the need for at least one replacement part suitable for maintenance of the fluidic device and is designed for sending the message with data on the required replacement part to a replacement part procurement device.

7. A diagnostic device according to claim 6, wherein the values defining the at least one wear status and/or the at least one wear parameter are parameterized by the diagnostic device.

8. A diagnostic device according to claim 6, wherein the diagnostic device contains program code embedded in a computer-readable medium which can be executed by a processor unit to control and/or monitor the fluidic device.

9. A diagnostic device according to claim 6, wherein the diagnostic device is designed as an integrated monochip microprocessor device whose components form constituents of a single electronic element, the single electronic element being locally associated with the fluidic device.

10. A diagnostic device according to claim 6, wherein the output module for reporting of the at least one wear status is configured as a preventive message in which the fluidic device is partly operational and/or has limited operability.

* * * * *